(12) United States Patent
Iizuka et al.

(10) Patent No.: US 8,635,434 B2
(45) Date of Patent: Jan. 21, 2014

(54) MATHEMATICAL OPERATION PROCESSING APPARATUS FOR PERFORMING HIGH SPEED MATHEMATICAL OPERATIONS

(75) Inventors: Yasuhiro Iizuka, Kanagawa (JP); Takahiro Sato, Tokyo (JP); Takayasu Kon, Tokyo (JP); Kenichi Sanpei, Chiba (JP); Eiichiro Morinaga, Tokyo (JP)

(73) Assignee: Sony Corporation, Tokyo (JP)

( * ) Notice: Subject to any disclaimer, the term of this patent is extended or adjusted under 35 U.S.C. 154(b) by 1378 days.

(21) Appl. No.: 11/987,700

(22) Filed: Dec. 4, 2007

(65) Prior Publication Data

US 2008/0148012 A1     Jun. 19, 2008

(30) Foreign Application Priority Data

Dec. 13, 2006  (JP) .................... 2006-335583

(51) Int. Cl.
*G06F 7/38*   (2006.01)
*G06F 9/00*   (2006.01)
*G06F 9/44*   (2006.01)

(52) U.S. Cl.
USPC .......................................... 712/221; 712/226

(58) Field of Classification Search
USPC ........................................................ 712/226
See application file for complete search history.

(56) References Cited

U.S. PATENT DOCUMENTS 5,812,836 A * 9/1998 Bates et al. ................ 712/220
6,516,407 B1 * 2/2003 Suga et al. ................. 712/226
6,650,317 B1 * 11/2003 Boone et al. ............... 345/168
6,697,276 B1 * 2/2004 Pereira et al. ............ 365/49.17
2009/0228691 A1 * 9/2009 Furuta et al. ................. 712/221

FOREIGN PATENT DOCUMENTS

| JP | 60-043751 | 3/1985 |
| JP | 04-184535 | 7/1992 |
| JP | 05-274143 | 10/1993 |
| JP | 09-091141 | 4/1997 |
| JP | 11-053189 | 2/1999 |
| JP | 2006-209805 | 8/2006 |

* cited by examiner

*Primary Examiner* — Andrew Caldwell
*Assistant Examiner* — William B Partridge
(74) *Attorney, Agent, or Firm* — Rader, Fishman & Grauer PLLC

(57) ABSTRACT

A mathematical operation processing apparatus is disclosed by which the supply of an operand which is performed based on condition codes by a plurality of mathematical operations can be performed at a high speed. The mathematical operation processing apparatus includes a plurality of computing elements configured to perform different mathematical operations different from one another and produce mathematical operation results of the mathematical operations and condition codes. A condition code set register retains the condition codes produced simultaneously by the computing elements as a condition code set. A condition code conversion section performs a predetermined conversion for the condition code set and outputs a result of the conversion as a conversion condition code set. An operand supplying section supplies an operand for the mathematical operations in the computing elements based on the conversion condition code set.

13 Claims, 17 Drawing Sheets

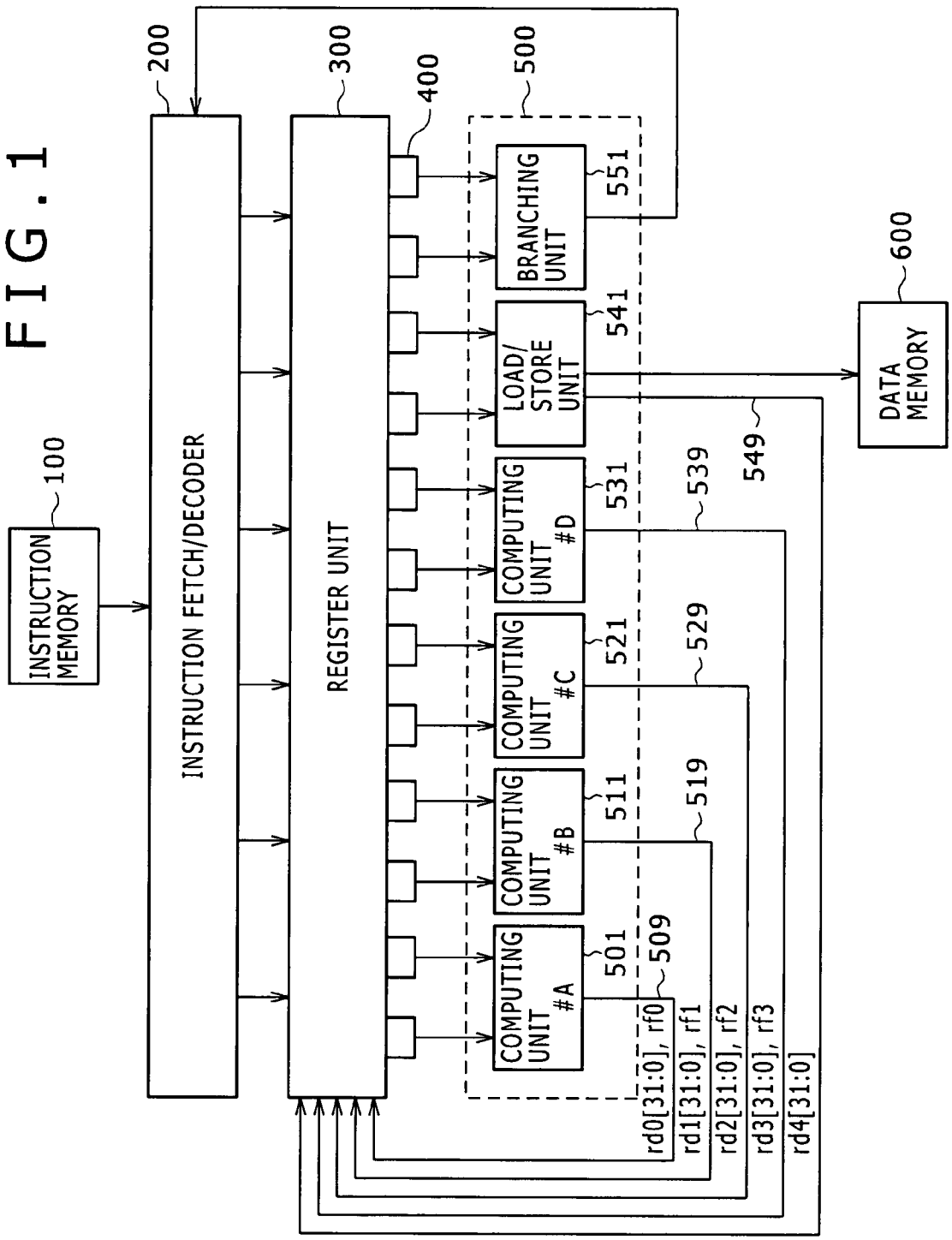

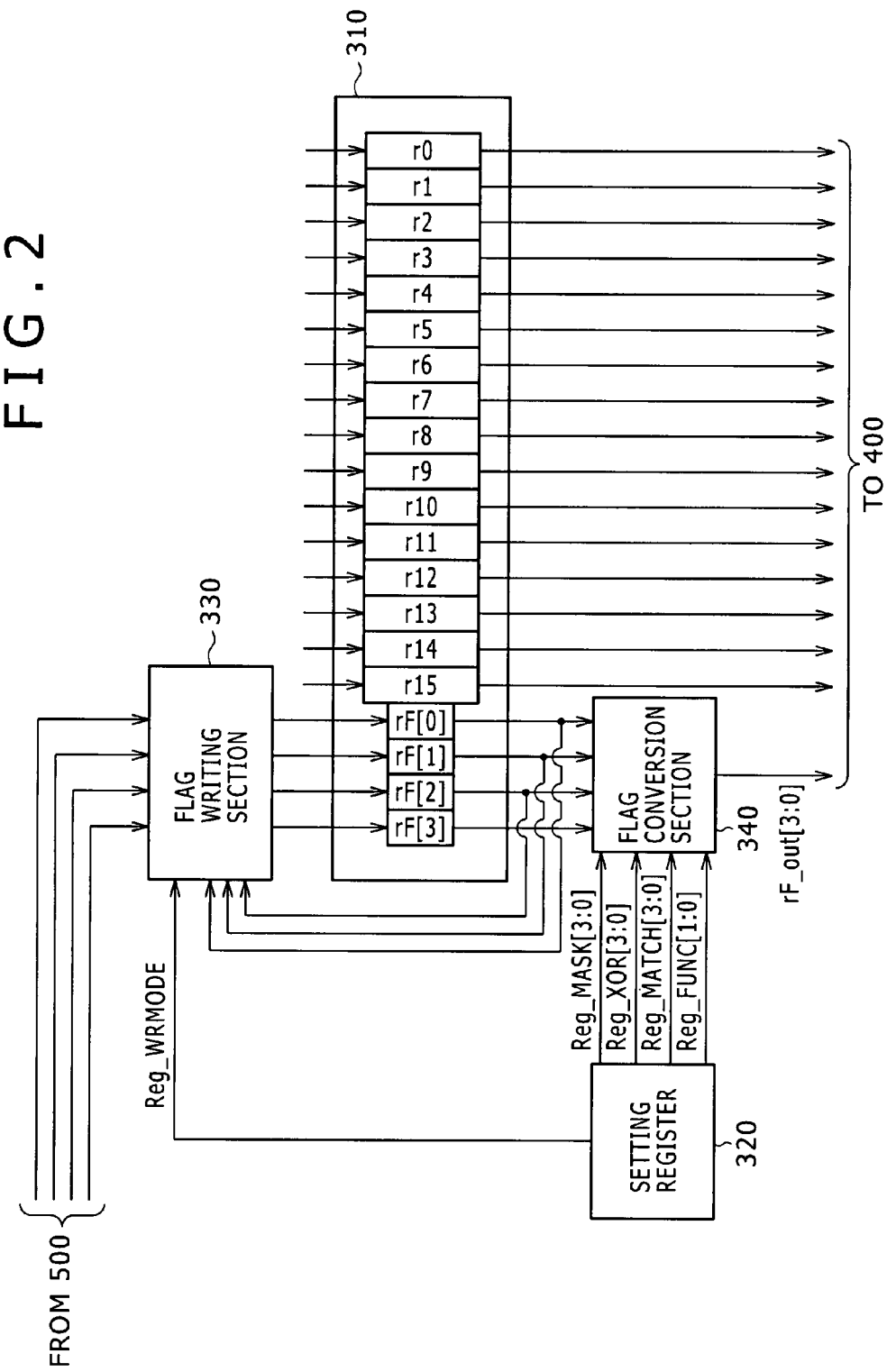

Reg_WRMODE=0

Reg_WRMODE=1

FIG.8A if (r0==r1 && r2>r3 && r4!=r5 && r6=<r7) func1();

FIG.8B

| EQ r0, r1 | GT r2, r3 | EQ r4, r5 | GT r6, r7 | nop | nop |
|---|---|---|---|---|---|
| nop | nop | nop | nop | nop | BRF func1 |

FIG.10A

```
if      (r10>r11) func1();
else if (r10>r12) func2();
else if (r10>r13) func3();
else if (r10>r14) func4();
```

FIG.10B

| GT r10, r11 | GT r10, r12 | GT r10, r13 | GT r10, r14 | nop | nop |
|---|---|---|---|---|---|
| nop | nop | nop | nop | nop | JMPf |

FIG.13A

```
if      (r10>r11) r5 = r0;
else if (r10>r12) r5 = r1;
else if (r10>r13) r5 = r2;
```

FIG.13B

| GT r10, r11 | nop | nop | nop | nop | nop |
|---|---|---|---|---|---|

| GT r10, r12 | nop | nop | nop | nop | nop |
|---|---|---|---|---|---|

| GT r10, r13 | nop | nop | nop | nop | nop |
|---|---|---|---|---|---|

| MVf r5 | nop | nop | nop | nop | nop |
|---|---|---|---|---|---|

FIG.15

| | | |
|---|---|---|
| 0111 | 0 | ⟵ 345 |
| 0110 | 0 | |
| 0101 | 0 | |
| 0100 | 0 | |
| 0011 | 1 | |
| 0010 | 1 | |
| 0001 | 2 | |

FIG.16A

```
if      (r10>r11) r5 = mem (base+8);
else if (r10>r12) r5 = mem (base+4);
else if (r10>r13) r5 = mem (base+0);
```

FIG.16B

| GT r10, r11 | GT r10, r12 | GT r10, r13 | nop | nop | nop |
|---|---|---|---|---|---|
| nop | nop | nop | nop | LWf r5, r0 | nop |

FIG.18

| | | |
|---|---|---|
| 0111 | 8 | ↙ 345 |
| 0110 | 8 | |
| 0101 | 8 | |
| 0100 | 8 | |
| 0011 | 4 | |
| 0010 | 4 | |
| 0001 | 0 | |

MATHEMATICAL OPERATION PROCESSING APPARATUS FOR PERFORMING HIGH SPEED MATHEMATICAL OPERATIONS

CROSS REFERENCES TO RELATED APPLICATIONS

The present invention contains subject matter related to Japanese Patent Application JP 2006-335583 filed in the Japan Patent Office on Dec. 13, 2006, the entire contents of which are incorporated herein by reference.

BACKGROUND OF THE INVENTION

1. Field of the Invention

This invention relates to a mathematical operation processing apparatus and, more particularly, to a mathematical operation processing apparatus wherein a plurality of computing units individually perform a mathematical operation in synchronism with each other. The present invention relates also to a processing method for such a mathematical operation and a program for causing a computer to execute the processing method.

2. Description of the Related Art

In processor architectures in recent years, it has been proposed frequently to shorten the machine cycle and increase the number of instructions to be executed per one machine cycle to achieve an improvement of the effective performance. As one of such processor architectures, a VLIW (Very Long Instruction Word) system is known. In the VLIW system, a plurality of mathematical operations and so forth are designated in one instruction and executed at the same time.

Generally, when a processor executes a mathematical operation, a state of the mathematical operation is outputted as a condition code together with a result of the mathematical operation. Based on the condition code, for example, coincidence, a mathematical relationship or the like of numerical values can be detected.

According to a processor architecture by the VLIW system in the past, a condition code generated by some of a plurality of instruction processing sections is selected, and a conditional branching instruction or some other conditional instruction is executed based on the selected condition code. The processor architecture of the type described is disclosed, for example, in Japanese Patent Laid-Open No. Hei 9-91141 (FIG. 1).

SUMMARY OF THE INVENTION

According to the processor architecture by the VLIW system in the past, one of condition codes of the mathematical operations executed simultaneously can be used as a branching condition to execute a conditional branching instruction or the like.

However, where complicated decision conditions are involved, it is necessary to store condition codes of the individual mathematical operations and separately perform mathematical operations for combining the condition codes and then produce operands of succeeding instructions. Further, the branching destination address sometimes differs depending upon the condition code, and in this instance, it is necessary to produce the operand of a branching instruction based on the condition codes of the mathematical operations and determine the branching destination address of the produced branching instruction. Where such an additional mathematical operation is supposed, there is the possibility that the advantage of the VLIW system that a plurality of mathematical operations are executed simultaneously to achieve high speed operation may be damaged.

Therefore, it is demanded to provide a mathematical operation processing apparatus by which a supply of an operand which is performed based on condition codes by a plurality of mathematical operations can be performed at a high speed.

According to an embodiment of the present invention, there is provided a mathematical operation processing apparatus including a plurality of computing elements configured to perform different mathematical operations different from one another and produce mathematical operation results of the mathematical operations and condition codes, a condition code set register configured to retain the condition codes produced simultaneously by the computing elements as a condition code set, a condition code conversion section configured to perform a predetermined conversion for the condition code set and output a result of the conversion as a conversion condition code set, and an operand supplying section configured to supply an operand for the mathematical operations in the computing elements based on the conversion condition code set. In the mathematical operation processing apparatus, condition codes produced simultaneously by a plurality of different mathematical operations are set as a condition code set, and predetermined conversion is performed for the condition code set. Then, an operand is supplied based on a result of the conversion.

According to another embodiment of the present invention, there is provided a mathematical operation processing apparatus including a plurality of computing elements configured to perform different mathematical operations different from one another and produce mathematical operation results of the mathematical operations and condition codes, a condition code set register configured to retain the condition codes produced by the computing elements as a condition code set, a condition code writing section configured to cause the condition code set register to retain part of the condition code set retained in the condition code set register and part of the condition codes produced simultaneously by the computing elements as a new condition code set, a condition code conversion section configured to perform predetermined conversion for the condition code set and output a result of the conversion as a conversion condition code set, and an operand supplying section configured to supply an operand for the mathematical operations in the computing elements based on the conversion condition code set. In the mathematical operation processing apparatus, condition codes produced by a plurality of different mathematical operations are set as a condition code set, and a predetermined conversion is performed for the condition code set. Then, an operand is supplied based on a result of the conversion.

According to a further embodiment of the present invention, there is provided a mathematical operation processing apparatus including a plurality of computing elements configured to perform different mathematical operations different from one another and produce mathematical operation results of the mathematical operations and condition codes, a masking register configured to retain mask bits representative of whether masking mathematical operation should be performed for each of the condition codes, a masking computing element configured to perform a masking computing operation in accordance with the masking register for each of the condition codes, an inversion register configured to retain an inversion bit representative of whether or not an inversion process should be performed for each of the condition codes processed by the masking computing element, an inversion processor configured to perform an inversion process for each of the condition codes processed by the masking computing element in accordance with the inversion register, a comparison pattern register configured to retain a pattern to be used as an object of comparison for each of the condition codes processed by the inversion processor, a comparator configured to compare the condition codes processed by the inversion processor and the pattern retained in the comparison pattern register, a conversion table configured to retain conversion condition code sets corresponding to combinations of the condition codes processed by the inversion processor, a selector configured to select one of the conversion condition code sets read out from the conversion table in response to a result of the comparison by the comparator, the condition codes processed by the inversion processor or a combination of the condition codes processed by the inversion processor, and an operand supplying section configured to supply an operand for the mathematical operations in the computing elements based on an output of the comparator. In the mathematical operation processing apparatus, condition codes produced by a plurality of different mathematical operations are set as a condition code set, and a masking operation process, an inversion process, a comparison process and a table conversion process are performed for the condition code set. Then, an operand is supplied based on a resulting value of one of the processes.

According to a still further embodiment of the present invention, there is provided a mathematical operation processing apparatus including an instruction memory configured to retain a program including a plurality of instructions, an instruction fetch/decoder configured to extract an instruction from the instruction memory and decode the instruction, a plurality of computing elements configured to perform different mathematical operations different from one another based on a result of the decoding and produce mathematical operation results of the mathematical operations and condition codes, a branching processing section configured to determine an instruction to be extracted by the instruction fetch/decoder based on the result of the decoding, a data memory, a load/store processing section configured to access the data memory to load necessary data from the data memory or store necessary data into the data memory, a condition code set register configured to retain the condition codes produced simultaneously by the computing elements as a condition code set, a condition code conversion section configured to perform a predetermined conversion for the condition code set and output a result of the conversion as a conversion condition code set, and an operand supplying section configured to supply an operand for the mathematical operations in the computing elements, the determination by the branching processing section or the accessing by the load/store processing section based on the conversion condition code set. In the mathematical operation processing apparatus, condition codes produced simultaneously by a plurality of different mathematical operations based on a plurality of instructions read out from the instruction memory are set as a condition code set, and a predetermined conversion is performed for the condition code set. Then, an operand is supplied based on a result of the conversion.

The mathematical operation processing apparatus according to the present invention is advantageous in that supply of an operand which is performed based on condition codes by a plurality of mathematical operations can be performed at a high speed.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 1 is a block diagram showing an example of a configuration of a mathematical operation processing apparatus according to one embodiment of the present invention;

FIG. 2 is a block diagram showing an example of a configuration of a register unit shown in FIG. 1;

FIGS. 8A and 8B are views illustrating a first example of a program illustrating an operation of the mathematical operation processing apparatus;

FIGS. 10A and 10B are views illustrating a second example of a program illustrating an operation of the mathematical operation processing apparatus;

FIGS. 13A and 13B are views illustrating a third example of a program illustrating an operation of the mathematical operation processing apparatus;

FIG. 15 is a block diagram illustrating an example of setting a flag conversion table for executing the third program example of FIGS. 13A and 13B;

FIGS. 16A and 16B are views illustrating a fourth example of a program illustrating an operation of the mathematical operation processing apparatus;

FIG. 18 is a block diagram illustrating an example of setting a flag conversion table for executing the fourth program example of FIGS. 16A and 16B.

DETAILED DESCRIPTION OF THE PREFERRED EMBODIMENT

Figure 3A:
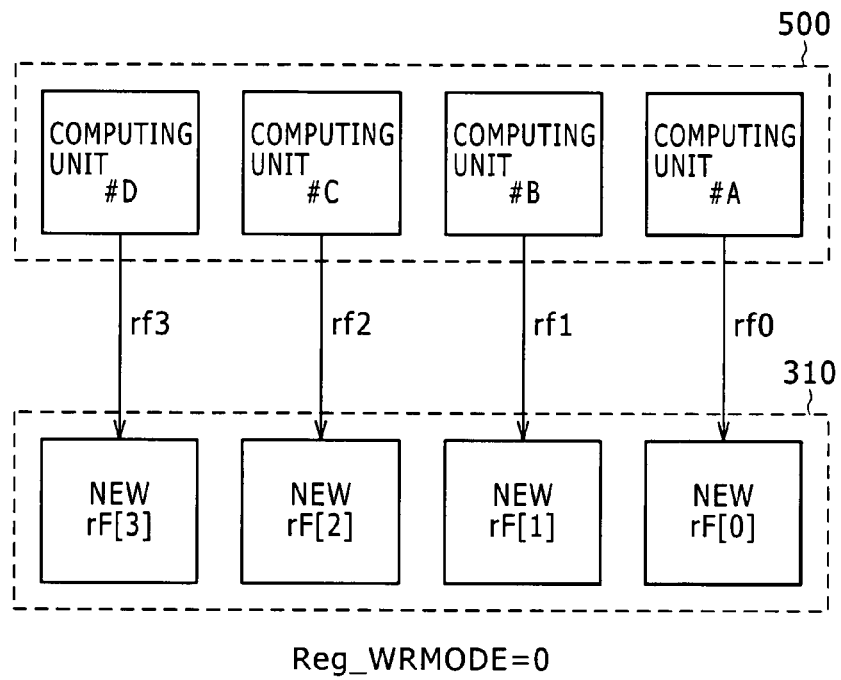
FIGS. 3A and 3B are diagrammatic views illustrating an example of operation modes of a flag writing section shown in FIG. 1.

FIG. 1 shows an example of a configuration of a mathematical operation processing apparatus to which the present invention is applied. Referring to FIG. 1, the mathematical operation processing apparatus shown includes an instruction memory 100, an instruction fetch/decoder 200, a register unit 300, an operand selector 400, an execution unit group 500, and a data memory 600.

The instruction memory 100 retains a program including a plurality of instructions. The instruction memory 100 may be a region of part of a main storage or an instruction buffer which retains part of the main storage.

The instruction fetch/decoder 200 fetches a necessary instruction from the instruction memory 100 and decodes the fetched instruction. The substance of a process to be executed by the execution unit group 500 is determined based on a result of the decoding of the instruction fetch/decoder 200. In the present embodiment, a processor architecture according to the VLIW system is presupposed, and it is assumed that six instructions of the 32-bit width are fetched simultaneously and decoded.

The register unit 300 retains data necessary for processing by the execution unit group 500. The register unit 300 includes a plurality of data registers and a condition code set register and performs reading out or writing based on a result of decoding by the instruction fetch/decoder 200.

The operand selector 400 supplies a necessary operand to the execution unit group 500. In the present embodiment, it is assumed that first and second operands are supplied to six units of the execution unit group 500 respectively.

The execution unit group 500 performs substantial processing of the mathematical operation processing apparatus. In the present embodiment, the execution unit group 500 includes six units, including a computing unit #A 501, a computing unit #B 511, a computing unit #C 521, a computing unit #D 531, a load/store unit 541 and a branching unit 551. The six units mentioned execute an operation at the same time.

The computing units #A to #D 501, 511, 521 and 531 execute the four basic mathematical operations, logical operation and so forth for the first and second operands supplied thereto from the operand selector 400 and output mathematical operation results (rd0[31:0], rd1[31:0], rd2[31:0] and rd3[31:0] to signal lines 509, 519, 529 and 539, respectively. Here, among the mathematical operation results, rd0 [31:0] represents a mathematical operation result of 32 bits wherein the MSB is the 31st bit and the LSB is the 0th bit as an output of the mathematical operation unit #A (501). Also, the other mathematical operation results rd1[31:0], rd2[31:0] and rd3[31:0] similarly represent mathematical operation results of 32 bits of the mathematical operation units #B (511), #C (521) and #D (531), respectively.

Further, each of the computing units #A to #D 501, 511, 521 and 531 determines a state upon mathematical operation processing as a condition code (rf0, rf1, rf2 or rf3) and outputs the same together with a result of the mathematical operation. In this example, rf0 is a condition code of 1 bit of the computing unit #A 501, and indicates "1" if the mathematical operation result is true, but indicates "0" if the mathematical operation result is false. Similarly, this applies also to the other condition codes rf1, rf2 and rf3, and they represent condition codes of the computing units #B 511, #C 521 and #D 531, respectively.

The mathematical operation results rd0[31:0], rd1[31:0], rd2[31:0] and rd3[31:0] and the condition codes rf0, rf1, rf2 and rf3 are supplied to the register unit 300.

The load/store unit 541 accesses the data memory 600 based on the first and second operands supplied thereto from the operand selector 400. If the instruction decoded by the instruction fetch/decoder 200 is a load instruction, then the load/store unit 541 reads out data from the data memory 600 and supplies the load data rd4[31:0] to the register unit 300 through a signal line 549. In the present example, rd4[31:0] represents load data of 32 bits. If the instruction decoded by the instruction fetch/decoder 200 is a store instruction, then the load/store unit 541 writes store data into the data memory 600.

The branching unit 551 decides whether or not the instruction sequence includes branching based on the first and second operands supplied from the operand selector 400. If the instruction sequence includes branching, then the branching unit 551 determines the branching destination address. A result of the decision by the branching unit 551 is supplied to the instruction fetch/decoder 200 and utilized for fetching and decoding of a next instruction.

The data memory 600 retains data necessary for the operation of a program. The data memory 600 may be a main storage or may be a data cache for retaining part of the main storage.

FIG. 2 shows an example of a configuration of the register unit 300 in the present embodiment. Referring to FIG. 2, the register unit 300 shown includes a register file 310, a setting register 320, a flag writing section 330 and a flag conversion section 340.

The register file 310 is a register group composed of a plurality of words. The substance of the register file 310 is divided in the data registers and the condition code set register. The data registers retain operand data for the execution unit group 500. In the present embodiment, it is assumed that 16 registers for 16 words (r0 to r15) of 32 bits are provided. The condition code set register retains condition code sets. Each of the condition codes set is a number of condition codes equal to the number of mathematical operation units. In the present embodiment, it is assumed that four registers for four words (rF[0] to rF[3]) for retaining a flag of one bit per one word are provided.

The setting register 320 is used to set information for controlling the operation of the register unit 300. In the present embodiment, the setting register 320 includes a write mode register Reg_WRMODE, a mask register Reg_MASK [3:0], an inversion register Reg_XOR[3:0], a comparison pattern register Reg_MATCH[3:0] and a function register Reg_FUNC[1:0]. The value of the write mode register is supplied to the flag writing section 330 while the values of the other four registers are supplied to the flag conversion section 340. The substance of the registers mentioned is described hereinafter.

The flag writing section 330 performs writing into the flags of the condition code set register of the register file 310 based on the value of the write mode register Reg_WRMODE of the setting register 320.

The flag conversion section 340 performs a conversion for the flags of the condition code set register of the register file 310 to produce a conversion condition code set rF_out [3:0]. To the flag conversion section 340, the mask register Reg_MASK[3:0], inversion register Reg_XOR[3:0], comparison pattern register Reg_MATCH[3:0] and function register Reg_FUNC[1:0] of the setting register 320 are supplied.

In the present embodiment, it is to be noted that writing into the data registers is similar to that of the ordinary mathematical operation processing apparatus, and therefore, a description of the same is omitted herein.

Figure 3B:
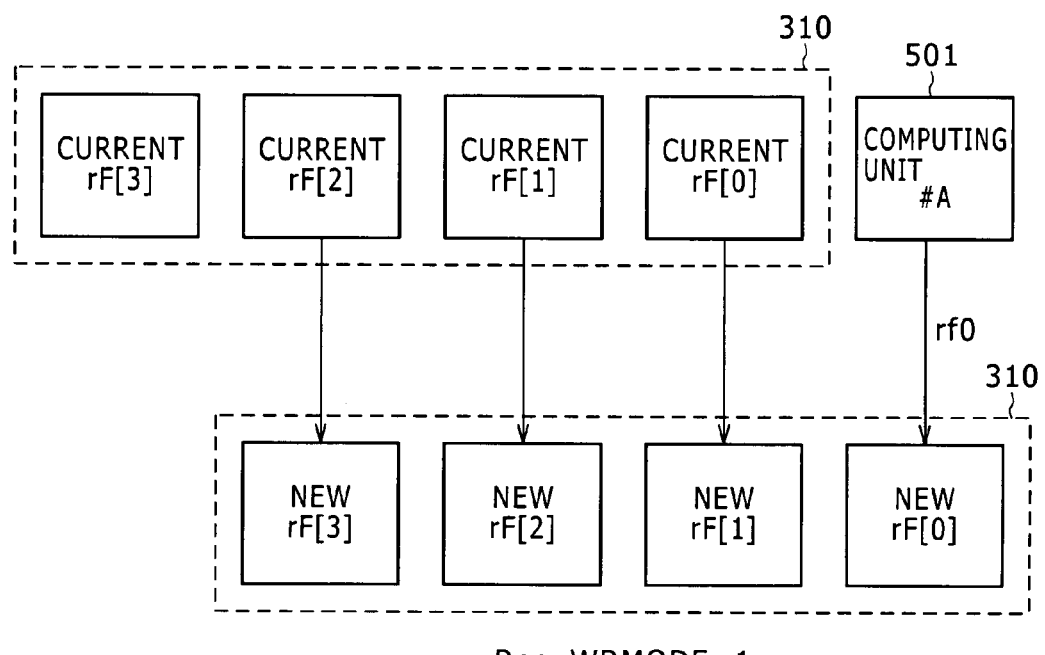

FIGS. 3A and 3B illustrate an example of operation modes of the flag writing section 330 in the present embodiment. As described hereinabove, the flag writing section 330 performs writing into the flags of the condition code set register of the register file 310 based on the value of the write mode register Reg_WRMODE of the setting register 320. When the value of the write mode register Reg_WRMODE indicates "0", the condition code rf0 outputted from the computing unit #A 501 is retained into the register rF[0] of the condition code set register as seen in FIG. 3A. Further, the condition code rf1 outputted from the computing unit #B 511 is retained into the register rF[1] of the condition code set register; the condition code rf2 outputted from the computing unit #C 521 is retained into the register rF[2] of the condition code set register; and the condition code rf3 outputted from the computing unit #D 531 is retained into the register rF[3] of the condition code set register. The state wherein the write mode register Reg_WRMODE indicates "0" hereinafter is referred to as through-mode.

On the other hand, where the write mode register Reg_WRMODE indicates "1", the condition code set register is shifted leftwardly in the direction toward the MSB, as seen in FIG. 3B. In particular, the value of the register rF[2] of the condition code set register is newly retained by the register rF[3]; the value of the register rF[1] is newly retained by the register rF[2]; and the value of the register rF[0] is newly retained by the register rF[1]. Then, a condition code outputted from one of the computing units #A to #D 501, 511, 521 and 531 is retained by the register rF[0]. While an example wherein the register rF[0] outputted from the computing unit #A 501 is retained by the register rF[0] of the condition code set register is indicated here, an object mathematical operation unit may be designated by some field of an instruction format. The state wherein the write mode register Reg_WRMODE is "1" hereinafter is referred to as history mode.

Figure 4:
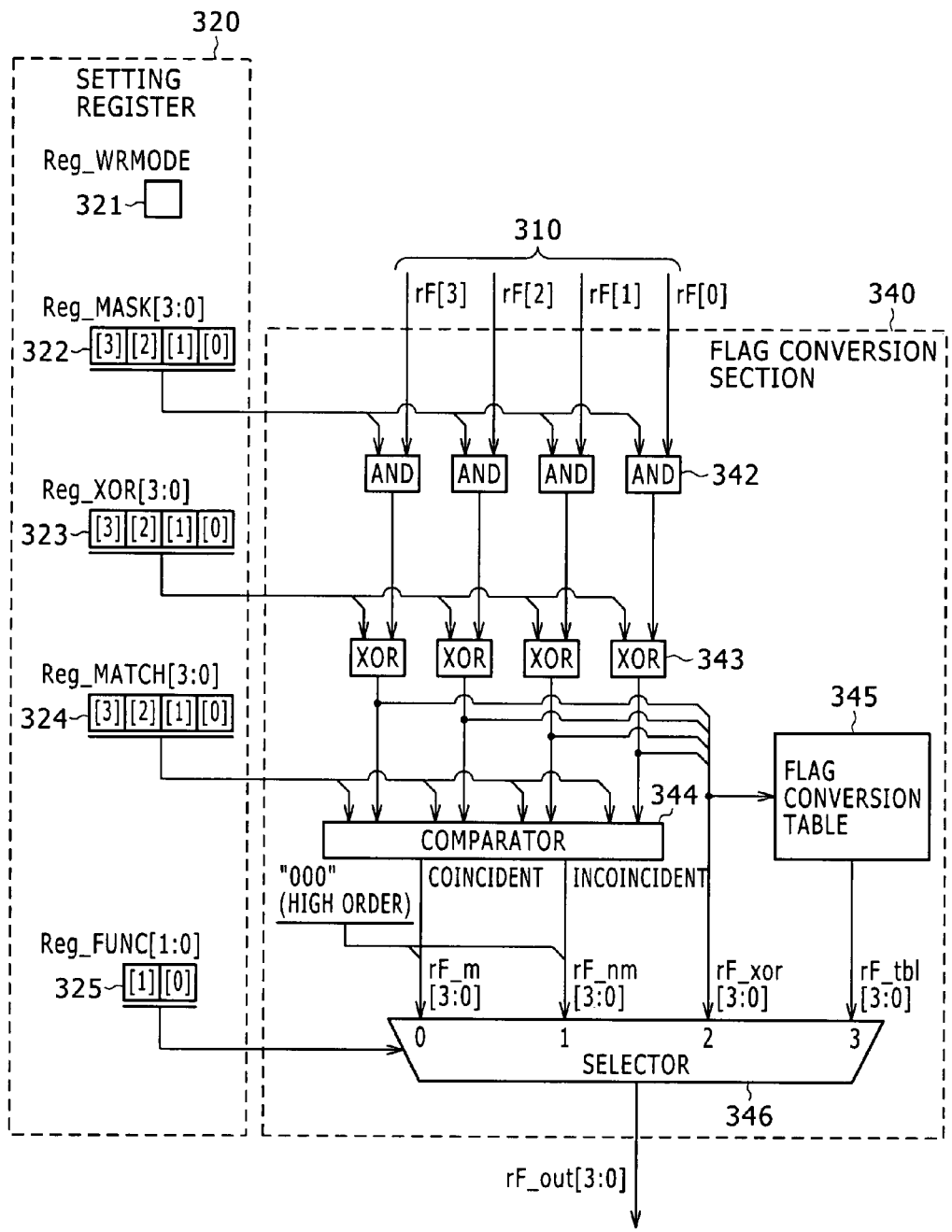
FIG. 4 is a block diagram showing an example of a configuration of a setting register and a flag conversion section shown in FIG. 2.

FIG. 4 shows an example of a configuration of the setting register 320 and the flag conversion section 340 in the present embodiment.

Referring to FIG. 4, the setting register 320 includes a write mode register Reg_WRMODE 321, a mask register Reg_MASK[3:0] 322, an inversion register Reg_XOR[3:0] 323, a comparison pattern register Reg_MATCH[3:0] 324 and a function register Reg_FUNC[1:0] 325.

The write mode register 321 designates an operation mode of the flag writing section 330 in writing into the condition code set register. In the present embodiment, when the write mode register 321 indicates "0", the flag writing section 330 operates in the through mode, but when the write mode register 321 indicates "1", the flag writing section 330 operates in the history mode.

The mask register 322 retains whether or not the flags of the condition code set register should be masked.

The inversion register 323 retains whether or not the flags of the condition code set register after a mask mathematical operation should be inverted.

The comparison pattern register 324 retains a bit pattern with which coincidence of the flags of the condition code set register after an inversion process should be detected.

The function register 325 retains a code representative of a function of the flag conversion section 340.

The flag conversion section 340 includes a logical ANDing unit 342, a logical exclusive ORing unit 343, a comparator 344, a flag conversion table 345 and a selector 346.

The logical ANDing unit 342 performs a logical ANDing operation between the flags of the condition code set register and corresponding bits of the mask register Reg_MASK[3:0] 322. In particular, if any bit of the mask register Reg_MASK [3:0] 322 is "0", then the corresponding output of the logical ANDing unit 342 is masked to "0", but if any bit of the mask register Reg_MASK[3:0] 322 is "1", then the value of the corresponding bit of the condition code set register is outputted as it is from the logical ANDing unit 342.

The logical exclusive ORing unit 343 performs a logical exclusive ORing operation between the bits of an output of the logical ANDing unit 342 and corresponding bits of the inversion register Reg_XOR[3:0] 323. In particular, if any bit of the inversion register Reg_XOR[3:0] 323 is "1", then the value of a bit of an output of the logical ANDing unit 342 is inverted and then outputted from the logical exclusive ORing unit 343, but if any bit of the inversion register Reg_XOR[3: 0] 323 is "0", then the value of the corresponding bit of the output of the logical ANDing unit 342 is outputted as it is from the logical exclusive ORing unit 343. The output of the logical exclusive ORing unit 343 is outputted as a signal rF_xor[3:0].

The comparator 344 compares an output of the logical exclusive ORing unit 343 and a bit pattern of the comparison pattern register Reg_MATCH[3:0] 324 and outputs whether or not they coincide with each other. In particular, if they coincide with each other, then the signal rF_m[3:0] becomes "0001" (binary number) and the signal rF_nm[3:0] becomes "10000" (binary number). On the other hand, if they do not coincide with each other, then the signal rF_m[3:0] becomes "0000" (binary number) and the signal rF_nm[3:0] becomes "0001" (binary number).

The flag conversion table 345 includes a plurality of entries and outputs a value corresponding to the output (signal rF_xor[3:0]) of the logical exclusive ORing unit 343 as a signal rF_tbl[3:0]. The flag conversion table 345 has desired values set in advance. In the present embodiment, it is assumed that 16 entries of 4 bits are retained.

The selector 346 selects a value corresponding to a code retained in the function register Reg_FUNC[1:0] 325. In particular, if the code retained in the function register Reg_FUNC[1:0] 325 is "0" (decimal number), then the signal rF_m[3:0] is selected, but if the code is "1" (decimal number), then the signal rF_nm[3:0] is selected. However, if the code is "2" (decimal number), then the signal rF_xor[3:0] is selected, but if the code is "3" (decimal number), then the signal rF_tbl [3:0] is selected. Then, the selected signal is outputted as a conversion condition code set rF_out[3:0].

Consequently, the value rf[3:0] of the condition code set register is masked or exclusive ORed for each bit to produce a signal rF_xor[3:0]. Thus, one of coincidence or incoincidence between the signal rF_xor[3:0] and the other bit pattern, the signal rF_xor[3:0] itself and the value in the flag conversion table 345 corresponding to the signal rF_xor[3:0] is outputted from the flag conversion section 340.

Figure 5:
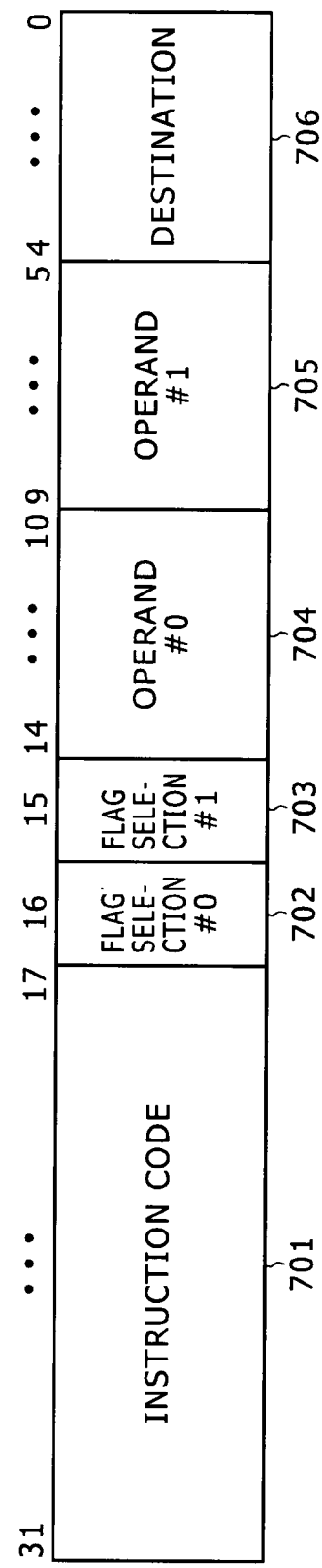
FIG. 5 is a diagrammatic view illustrating an example of an instruction format used in the mathematical operation processing apparatus.

FIG. 5 illustrates an example of an instruction format used in the present embodiment. In the present embodiment, it is assumed that six instructions of the 32-bit length are read out simultaneously from the instruction memory 100 and decoded by the instruction fetch/decoder 200. One of these instructions is illustrated in FIG. 5.

Referring to FIG. 5, in the instruction format illustrated, the instruction includes an instruction code field 701, a flag selection field #0 702, a flag selection field #1 703, an operand field #0 704, an operand field #1 705 and a destination field 706.

The instruction code field 701 retains a code representative of the type of the instruction and, in the present embodiment, has a 15-bit width.

The flag selection field #0 702 retains information of whether or not the operand field #0 704 should be selected as the first operand. Meanwhile, the flag selection field #1 703 retains information of whether or not the operand field #1 705 should be selected as the second operand. When any of the operand field #0 704 and the operand field #1 705 is not selected, an output (conversion condition code set rF_out[3: 0]) of the flag conversion section 340 is used. The flag selection field #0 702 and the flag selection field #1 703 in the present embodiment have a one-bit width.

The operand field #0 704 retains the first operand of the instruction. Meanwhile, the operand field #1 705 retains the second operand of the instruction. The operand field #0 704 and the operand field #1 705 in the present embodiment have a 5-bit width.

The destination field 706 retains an output destination of the instruction and, in the present embodiment, has a 5-bit width.

Figure 6:
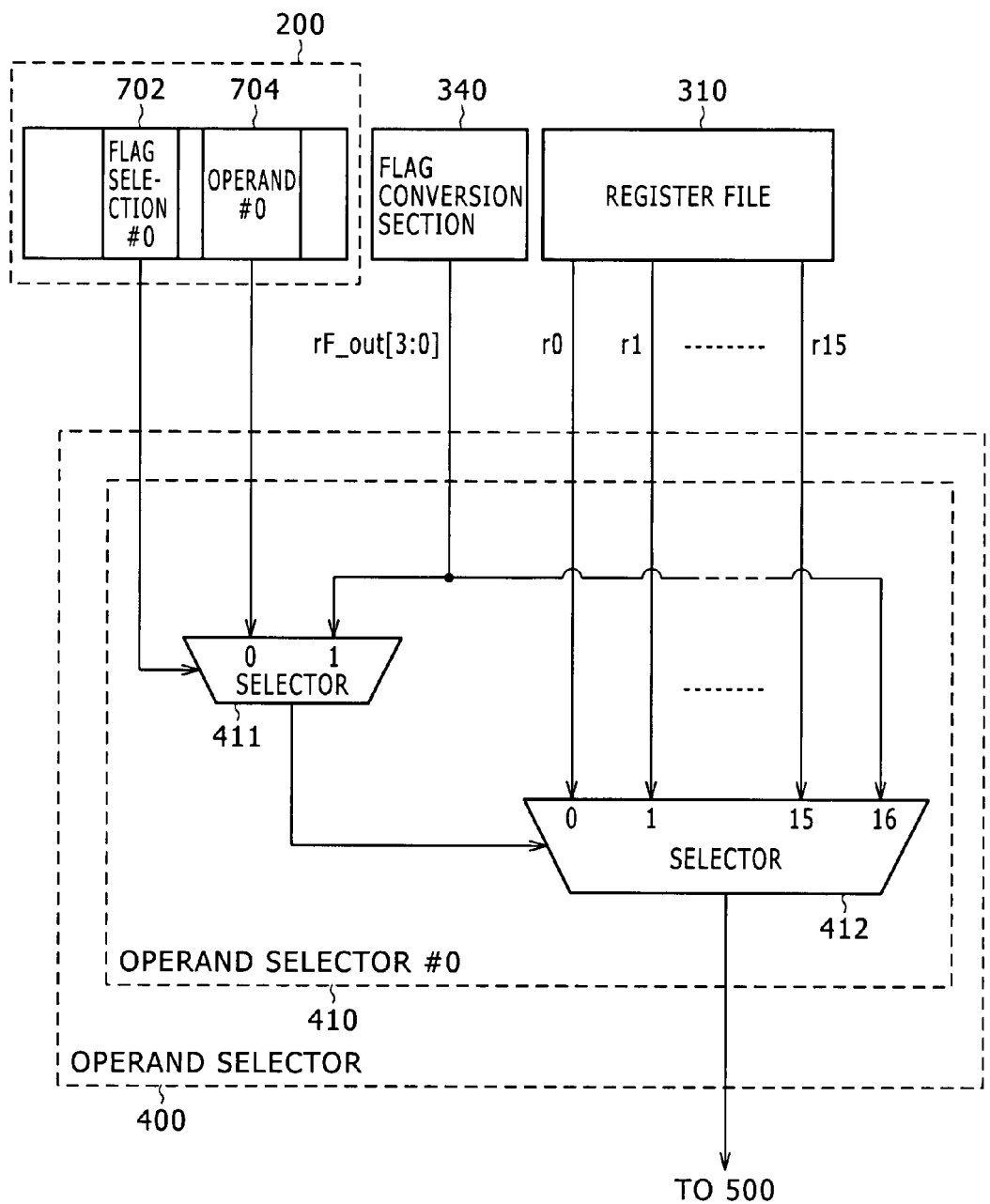
FIG. 6 is a block diagram showing an example of a configuration of a first operand selector of an operand selector shown in FIG. 1.

FIG. 6 shows an example of a configuration of a first operand selector #0 410 of the operand selector 400 in the present embodiment. The first operand selector #0 410 supplies the first operand of one of the units of the execution unit group 500. The first operand selector #0 410 includes a pair of selectors 411 and 412.

The selector 411 selects one of the operand field #0 704 and an output (conversion condition code set rF_out[3:0]) of the flag conversion section 340 in response to the flag selection field #0 702. In the present embodiment, when the flag selection field #0 702 is "0", the value of the operand field #0 704 is selected, but when the flag selection field #0 702 is "1", the output of the flag conversion section 340 is selected. The output of the selector 411 is supplied as a selection signal for the selector 412.

The selector 412 selects one of the values of the data registers r0 to r15 of the register file 310 and the output (conversion condition code set rF_out[3:0]) of the flag conversion section 340 in response to the output of the selector 411. In the present embodiment, when the output of the selector 411 has a value from "0" to "15" (decimal numbers), then the value of the data register corresponding to the value is selected, but if the output of the selector 411 has the value of "16" (decimal number), then the output of the flag conversion section 340 is selected.

Accordingly, if the flag selection field #0 702 is "0", then the value of one of the data registers (r0 to r15) which corresponds to the value indicated by the operand field #0 704 or the output of the flag conversion section 340 is supplied as the operand. On the other hand, if the flag selection field #0 702 is "1", then the value of one of the data registers (r0 to r15) indicated by the output of the flag conversion section 340 is supplied as the operand.

Figure 7:
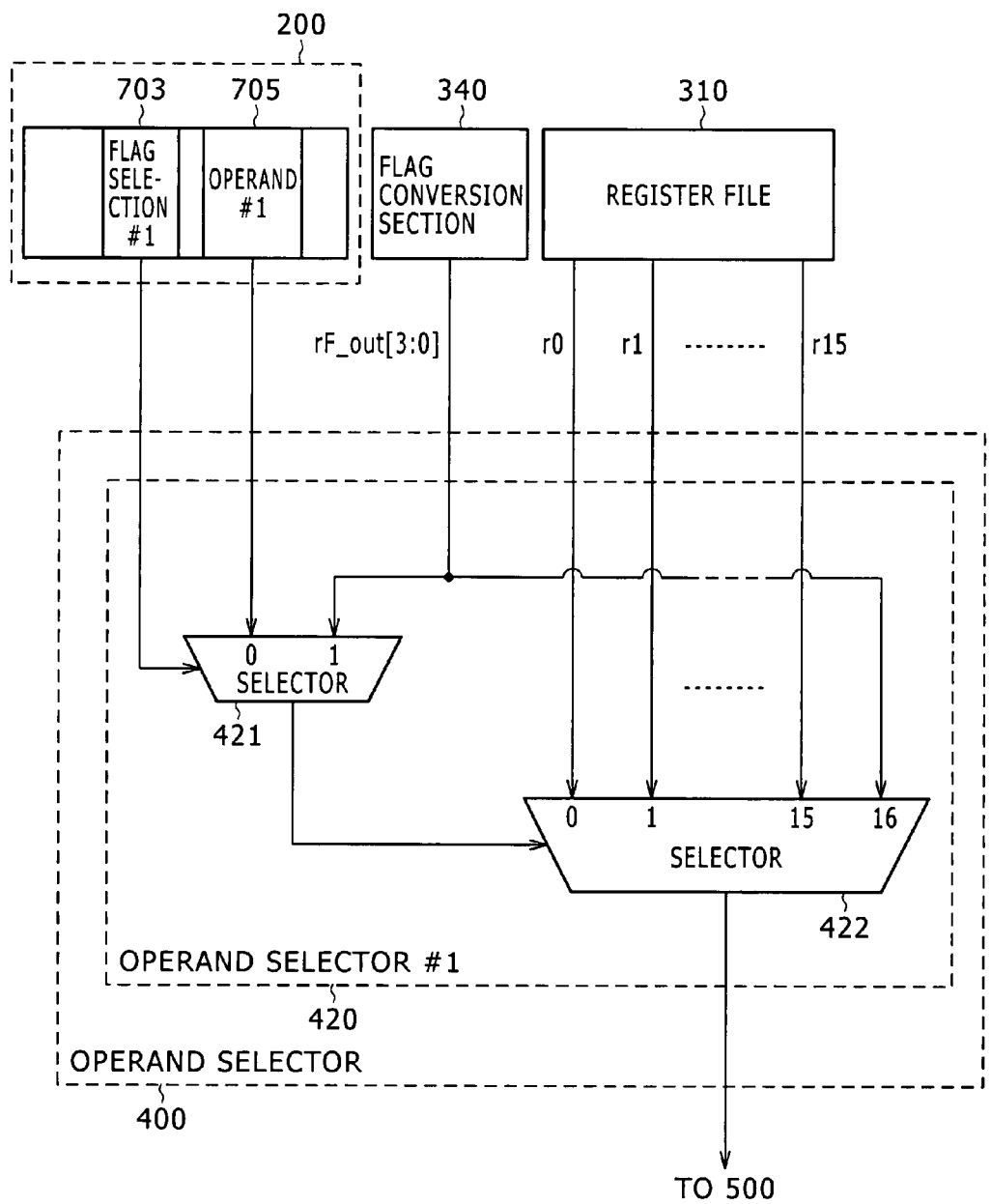
FIG. 7 is a block diagram showing an example of a configuration of a second operand selector of the operand selector shown in FIG. 1.

FIG. 7 shows an example of a configuration of a second operand selector #1 420 of the operand selector 400 in the present embodiment. Referring to FIG. 7, the second operand selector #1 420 supplies the second operand of one of the units of the execution unit group 500. The configuration of the second operand selector #1 420 is similar to that of the first operand selector #0 410 described hereinabove with reference to FIG. 7. However, the second operand selector #1 420 is different from the first operand selector #0 410 in that the flag selection field #1 703 is supplied as a selection signal for the selector 421 and the operand field #1 705 is supplied as the operand that is selected when the flag selection field #1 703 is "0".

In this manner, according to the present embodiment, condition codes outputted from the computing units #A to #D 501, 511, 521 and 531 are retained as a condition code set into the condition code set register. Then, the condition code set retained in the condition code set register is converted by the flag conversion section 340 and supplied to the operand selector 400. Consequently, the supply of an operand which is performed based on the condition codes by a plurality of mathematical operations can be performed at a high speed.

Now, an operation of the mathematical operation processing apparatus of the present invention is described in connection with particular examples.

FIGS. 8A and 8B illustrate a first example of a program illustrating the operation of the mathematical operation processing apparatus of the present embodiment. The first program example is used to decide four conditions simultaneously to determine whether or not the processing should be branched.

FIG. 8A illustrates a program of an object of processing in such a form as is represented by a high-level language. The program illustrated in FIG. 8A signifies that the processing should be branched to a function func1 if the value of the data register r0 and the value of the data register r1 coincide with each other, if the value of the data register r2 is higher than the value of the data register r3, if the value of the data register r4 and value of the data register r5 do not coincide with each other and if the value of the data register r6 is equal to or lower than the value of the data register r7.

FIG. 8B represents the program of the processing object in such a form as is represented by an assembly language, and six instructions juxtaposed in a horizontal direction are executed simultaneously. The instruction [EQ r0, r1] is executed by the computing unit #A 501; [GT r2, r3] is executed by the computing unit #B 511; [EQ r4, r5] is executed by the computing unit #C 521; and [GT r6, r7] is executed by the computing unit #D 531. Further, the instruction [BRf func1] is executed by the branching unit 551.

Here, the instruction [EQ rs, rt] is a condition decision instruction. If the value of the data register rs and the value of the data register rt coincide with (are equal to) each other, then "1" is outputted as the condition code, but in any other case, "0" is outputted as the condition code. Meanwhile, the instruction [GT rs, rt] is another condition decision instruction, and if the value of the data register rs is higher than the value of the data register rt, then "1" is outputted as the condition code, but in any other case, "0" is outputted. Further, the instruction [BRf func1] is a conditional branching instruction for branching, if rF_out[0] is "1", to the function func1. rF_out[0] is the value of the LSB of the flag conversion section 340 and func1 is a label representing the top address of the function. Meanwhile, the instruction [nop] is a no-operation instruction for executing nothing.

Figure 9:
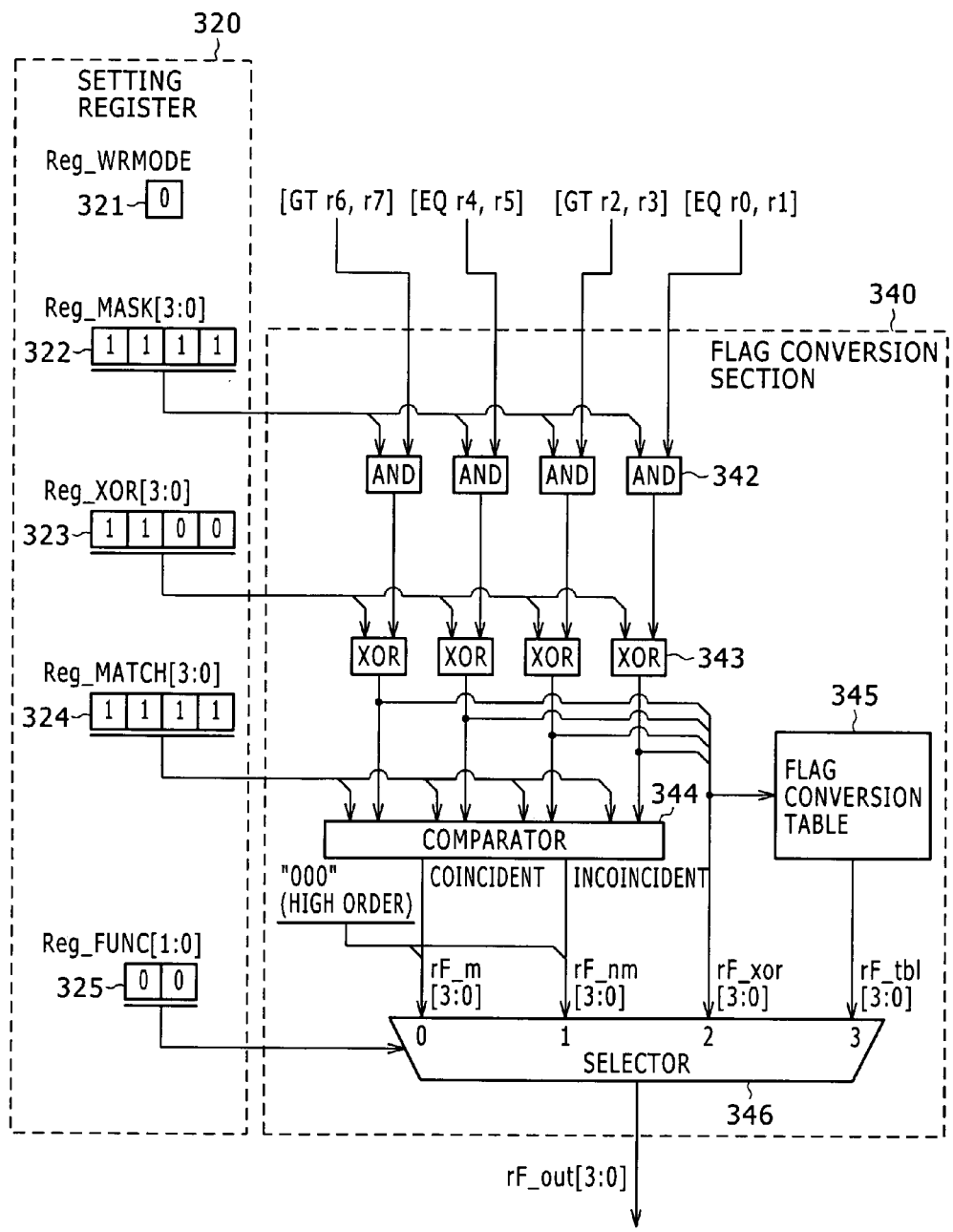
FIG. 9 is a block diagram illustrating an example of setting a setting register for executing the first program example of FIGS. 8A and 8B.

FIG. 9 illustrates an example of setting the setting register 320 for executing the program illustrated in FIG. 8. In the example of FIG. 9, "0" is set in the write mode register Reg_WRMODE 321 in advance while "1111" (binary number) is set in the mask register Reg_MASK[3:0] 322. Further, "1100" (binary number) is set in the inversion register Reg_XOR[3:0] 323, and "1111" (binary number) is set in the comparison pattern register Reg_MATCH[3:0] 324. Furthermore, "00" (binary number) is placed in the function register Reg_FUNC[1:0] 325. Setting of the set values can be performed by a software instruction. Or, the values may be embedded in the instruction format.

In the present example, since the write mode register Reg_WRMODE 321 is "0" (indicating the through mode), the condition codes for mathematical operation by the computing units #A to #D 501, 511, 521 and 531 are retained in the respective registers rF[0 to 3] of the condition code set register.

Then, a logical ANDing operation is performed between the values of the bits of the condition code set register and the corresponding bits of the mask register Reg_MASK[3:0] 322. In the present example, since the mask register Reg_MASK[3:0] 322 is "1111", any of the bits is not masked.

Then, an exclusive ORing operation is performed between the bits of the output of the logical ANDing unit 342 and corresponding bits of the inversion register Reg_XOR[3:0] 323 by the logical exclusive ORing unit 343. In the present example, since the inversion register Reg_XOR[3:0] 323 is "1100", the higher order 2 bits are inverted.

Further, the output of the logical exclusive ORing unit 343 and the bit pattern of the comparison pattern register Reg_MATCH[3:0] 324 are compared with each other by the comparator 344. In the present example, the bit pattern of the comparison pattern register Reg_MATCH[3:0] 324 is "1111". Therefore, if the conditions "that the values of the data register r0 and the value of the data register r1 coincide with each other, the value of the data register r2 is higher than the value of the data register r3, the value of the data register r4 and the value of the data register r5 do not coincide with each other and the value of the data register r6 is equal to or lower than the data register r7" are satisfied, then the signal rF_m[3:0] becomes "0001". However, if the conditions are not satisfied, then the signal rF_m[3:0] becomes "10000". In the present example, since the function register Reg_FUNC [1:0] 325 is "00", the value of the signal rF_m[3:0] is selected by the selector 346 and outputted as the label rF_out[3:0].

In the instruction [BRf func1], since the flag selection field #0 702 indicates "0" and the operand field #0 704 indicates "16", the value of the label rF_out[3:0] is supplied to the branching unit 551. The branching unit 551 branches the processing to the function func1 if the label rF_out[3:0] is "0001", but does not branch the processing if the label rF_out [3:0] is "0000".

In this manner, in the present embodiment, the program illustrated in FIG. 8 is executed, in two machine cycles. It is to be noted that, although these two machine cycles do not include time for setting the setting register 320, since, in an actual program, a principal mathematical operation is in most cases executed repetitively after the setting register 320 is set once, in such an instance, the time for the setting can be ignored.

FIGS. 10A and 10B illustrate a second example of a program illustrating an operation of the mathematical operation processing apparatus of the present embodiment. In the second program example, four conditions are set simultaneously and a branching destination is determined.

FIG. 10A illustrates a program of an object of processing in such a form as is represented by a high-level language. The program illustrated in FIG. 10A signifies that the processing should be branched to a function func1 if the value of the data register r10 is higher than the value of the data register r11, but in any other case, if the value of the data register r10 is higher than the value of the data register r12, then the processing branches to a function func2, but in any other case, if the value of the data register r10 is higher than the value of the data register r13, then the processing branches to a function func3, but in any other case, if the value of the data register r10 is higher than the value of the data register r14, then the processing branches to a function func4.

FIG. 10B represents the program of the processing object in such a form as is represented by an assembly language, and six instructions juxtaposed in a horizontal direction are executed simultaneously. The instruction [GT r10, r11] is executed by the computing unit #A 501; [GT r10, r12] is executed by the computing unit #B 511; [GT r10, r13] is executed by the computing unit #C 521; and [GT r10, r14] is executed by the computing unit #D 531. Further, the instruction [JMPf] is executed by the branching unit 551.

Here, the instruction [JMPf] is a register jump instruction for jumping the processing to an address placed in the data register designated by the label rF_out [3:0]. The other instructions are the same as those described hereinabove with reference to FIG. 8.

Figure 11:
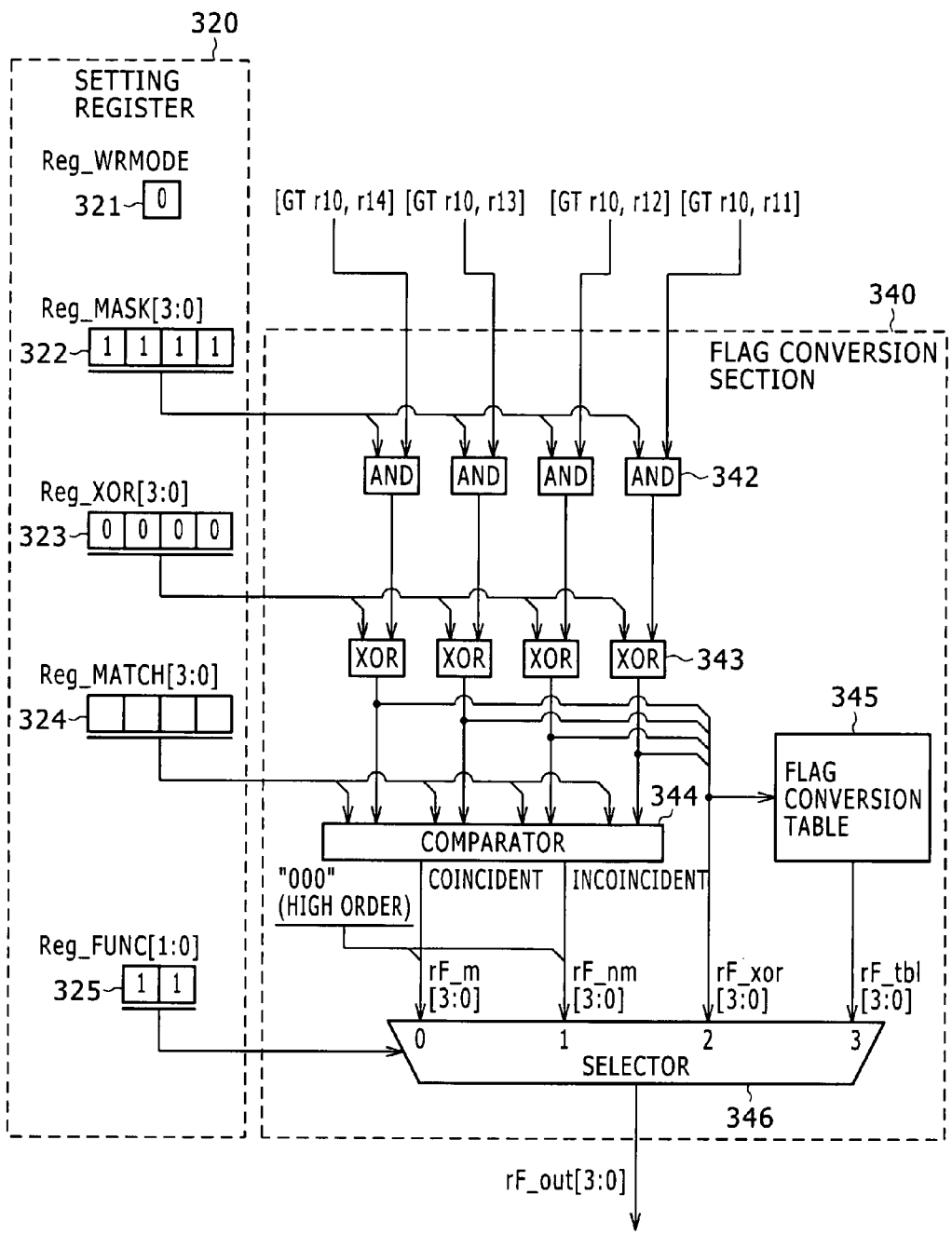
FIG. 11 is a block diagram illustrating an example of setting a setting register for executing the second program example of FIGS. 10A and 10B.

FIG. 11 illustrates an example of setting the setting register 320 for executing the second program example of FIG. 10. In the example illustrated in FIG. 11, "0" is set in the write mode register Reg_WRMODE 321 in advance; "1111" (binary number) is set in the mask register Reg_MASK[3:0] 322; "0000" (binary number) is set in the inversion register Reg_XOR[3:0] 323; and "11" (binary number) is set in the function register Reg_FUNC[1:0] 325.

In the present example, since the write mode register Reg_WRMODE 321 is "0" (indicating the through mode), the condition codes for mathematical operations by the computing units #A to #D 501, 511, 521 and 531 are retained in the registers rF[0 to 3] of the condition code set register.

Then, a logical ANDing operation is performed between the values of the flags of the condition code set register and the corresponding bits of the mask register Reg_MASK[3:0] 322 by the logical ANDing unit 342. However, in the present example, since the mask register Reg_MASK[3:0] 322 is "1111", any of the bits is not masked.

Then, an exclusive ORing operation is performed between the bits of the output of the logical ANDing unit 342 and the corresponding bits of the inversion register Reg_XOR[3:0] 323 by the logical exclusive ORing unit 343. In the present example, since the inversion register Reg_XOR[3:0] 323 is "0000", any of the bits is inversed.

In the present example, since the function register Reg_FUNC[1:0] 325 is "11", the value of the output rF_tbl [3:0] of the flag conversion table 345 is selected by the selector 346 and outputted as the label rF_out [3:0].

Figure 12:
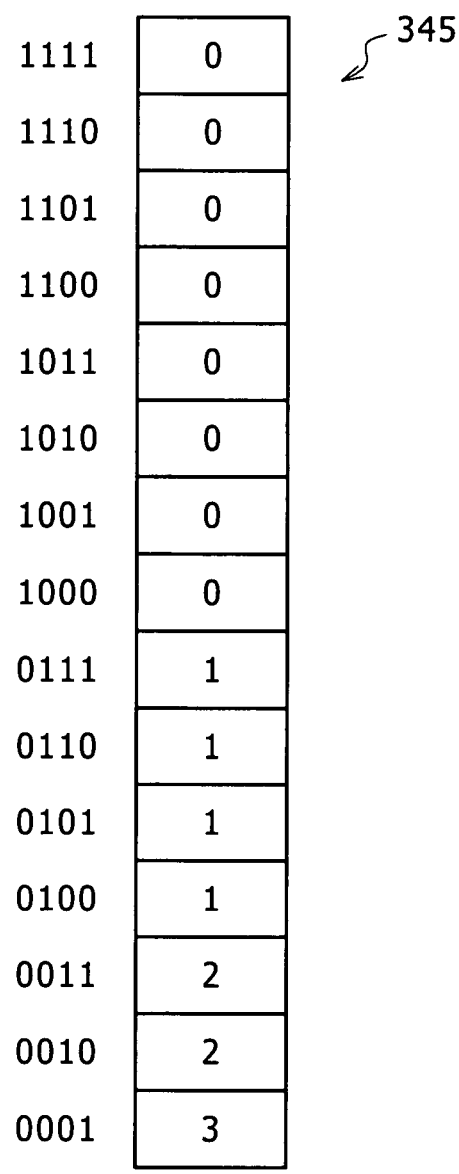
FIG. 12 is a view illustrating an example of setting a flag conversion table for executing the second program example of FIGS. 10A and 10B.

FIG. 12 illustrates an example of setting the flag conversion table 345 for executing the second program example of FIG. 10. Referring to FIG. 12, in the example illustrated, the value "3" (decimal number) is placed in the address "0001" of the flag conversion table 345 in advance; the value "2" (decimal number) is placed in the addresses "0010" and "0011"; the value "1" (decimal number) is placed in the addresses "0100" to "0111"; and the value "0" (decimal number) is placed in the addresses "1000" to "1111". The values placed signify the numbers of the data registers in which the address of the jumping destination is placed.

Together with this, the top address of the function func1 is set in the data register r0; the top address of the function func2 is set in the data register r1; the top address of the function func3 is set in the data register r2; and the top address of the function func4 is set in the data register r3.

The flag conversion table 345 is read out using the output rF_xor [0 to 3] of the logical exclusive ORing unit 343 as a read address and outputs a signal rF_tbl[3:0] to the selector 346. Accordingly, if the value of the data register r10 is higher than the value of the data register r11, then the signal rF_xor [0] becomes "1", and the value "0" (decimal number) is outputted as the signal rF_tbl[3:0]. In any other case, if the value of the data register r10 is higher than the value of the data register r12, then the signal rF_xor[1] becomes "1", and the value "1" (decimal number) is outputted as the signal rF_tbl[3:0]. In any other case, if the value of the data register r10 is higher than the value of the data register r13, then the signal rF_xor[2] becomes "1", and the value "2" (decimal number) is outputted as the signal rF_tbl[3:0]. In any other case, if the value of the data register r10 is higher than the value of the data register r13, then the signal rF_xor[3] becomes "1", and the value "3" (decimal number) is outputted as the signal rF_tbl[3:0].

In the instruction [JMPf], since the flag selection field #0 702 indicates "1", the label rF_out[3:0] is used as the selection signal for the selector 422 (FIG. 7), and the address placed in the data register indicated by the label rF_out[3:0] is supplied as the operand. Consequently, if one of the conditions is satisfied, then one of the addresses placed in the data register in advance is supplied to the instruction fetch/decoder 200 through the branching unit 551, and jumping to the corresponding function is performed.

In this manner, in the present embodiment, the second program example of FIG. 10 is executed in two machine cycles.

FIGS. 13A and 13B illustrate a third example of a program illustrating an operation of the mathematical operation processing apparatus of the present embodiment. The third program example is used to decide three conditions one by one in order to select a value to be substituted into a register.

FIG. 13A illustrates a program of an object of processing in such a form as is represented by a high-level language. The program illustrated in FIG. 13A signifies that, if the value of the data register r10 is higher than the value of the data register r11, then the value of the data register r0 is substituted into the data register r5, but in any other case, if the value of the data register r10 is higher than the value of the data register r12, then the value of the data register r1 is substituted into the data register r5, but in any other case, if the value of the data register r10 is higher than the value of the data register r13, then the value of the data register r2 is substituted into the data register r5.

FIG. 13B represents the program of a processing object in such a form as is represented by an assembly language, and six instructions juxtaposed in a horizontal direction are executed simultaneously. In the present example, substantive instructions are all executed on the computing unit #A 501 while the other units execute the nop instruction.

Here, the instruction [MVf r5] is a transfer instruction for transferring (moving) the value of the data register indicated by the label rF_out[3:0] to the data register r5. The other instructions are same as those described hereinabove with reference to FIG. 8.

Figure 14:
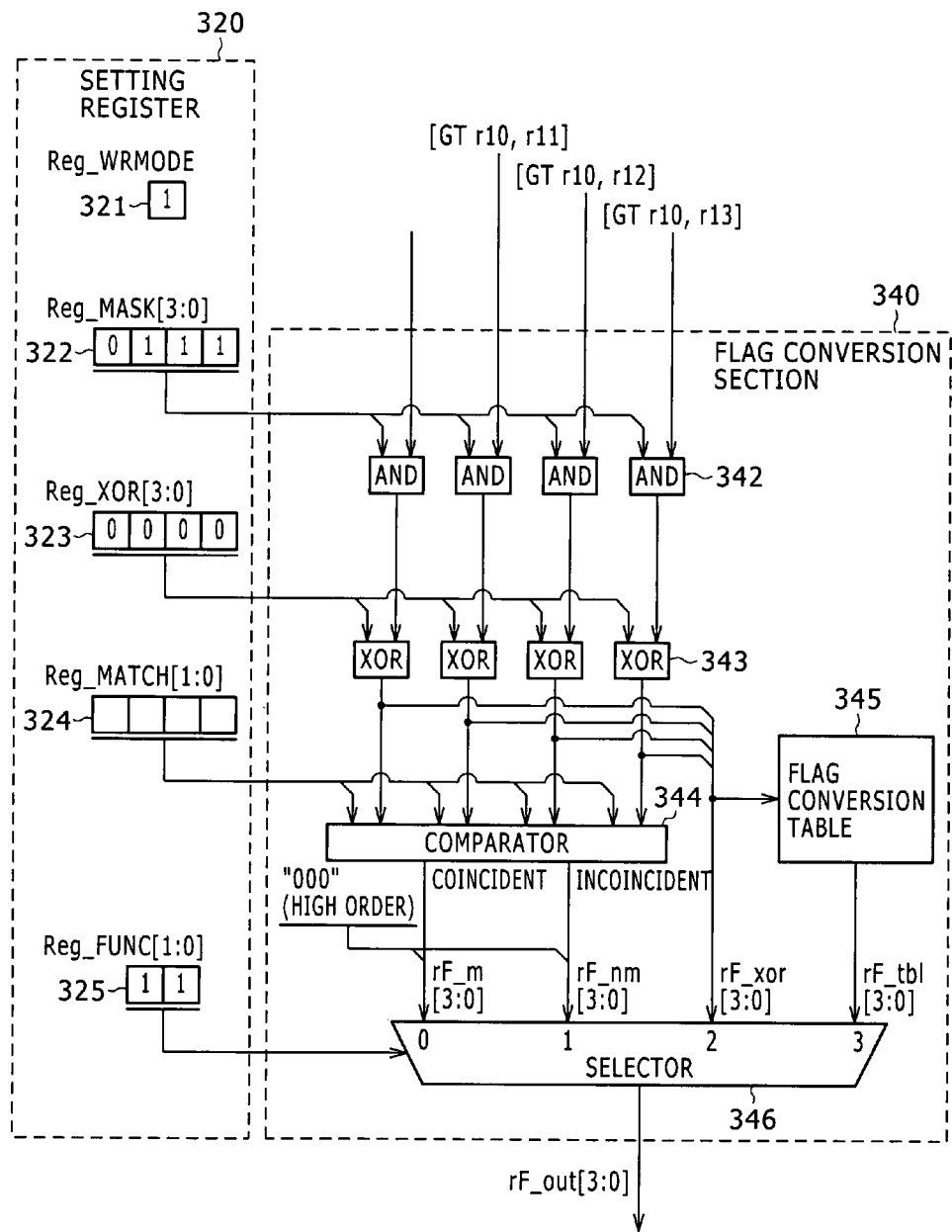
FIG. 14 is a block diagram illustrating an example of setting a setting register for executing the third program example of FIGS. 13A and 13B.

FIG. 14 shows an example of setting the setting register 320 for executing the third program example of FIG. 13. In the present example, "1" is set in the write mode register Reg_WRMODE 321 in advance; "0111" (binary number) is set in the mask register Reg_MASK[3:0] 322; "0000" (binary number) is set in the inversion register Reg_XOR[3:0] 323; and "11" (binary number) is set in the function register Reg_FUNC[1:0] 325.

Referring to FIG. 14, in the example shown, since the write mode register Reg_WRMODE 321 is "1" (indicating the history mode), the condition code of mathematical operation by the computing unit #A 501 is retained into the register rF[0] of the condition code set register, and thereafter, the code is successively shifted to the registers rF[1], rF[2] and rF[3]. Accordingly, in the present example, the condition code of "whether or not the value of the data register r10 is higher than the value of the data register r11" is retained in the register rF[2]; the condition code of "whether or not the value of the data register r10 is higher than the value of the data register r12" is retained in the register rF[1]; and the condition code of "whether or not the value of the data register r10 is higher than the value of the data register r13" is retained in the register rF[0].

Then, a logical ANDing operation is performed between the values of the flags of the condition code set register and the corresponding bits of the mask register Reg_MASK[3:0] 322 by the logical ANDing unit 342. In the present example, since the mask register Reg_MASK[3:0] 322 is "0111", only the register rF[3] is masked to "0".

Thereafter, an exclusive ORing operation is performed between the bits of the output of the logical ANDing unit 342 and the corresponding bits of the inversion register Reg_XOR [3:0] 323 by the logical exclusive ORing unit 343. In the present example, since the inversion register Reg_XOR[3:0] 323 is "0000", any one of the bits is not inverted.

In the present example, since the function register Reg_FUNC[1:0] 325 is "11", the values of the output rF_tbl [3:0] of the flag conversion table 345 are selected by the selector 346 and outputted as the label rF_out[3:0].

FIG. 15 illustrates an example of setting the flag conversion table 345 for executing the third program example of FIG. 13. In the present example, the value "2" (decimal number) is placed in the address "0001" of the flag conversion table 345 in advance; the value "1" (decimal number) is placed in the addresses "0010" and "0011"; and the value "0" (decimal number) is placed in the addresses "0100" to "0111". The values signify the numbers of the data registers in which the address of the jump destination is stored.

The flag conversion table 345 is read out using the output rF_xor[0 to 3] of the logical exclusive ORing unit 343 as the read address and outputs a signal rF_tbl[3:0] to the selector 346. Accordingly, if the value of the data register r10 is higher than the value of the data register r11, then the output rF_xor [2] becomes "1", and the value "0" (decimal number) is outputted as the signal rF_tbl[3:0]. In any other case, if the value of the data register r10 is higher than the data register r12, then the output rF_xor[1] becomes "1", and the value "1" (decimal number) is outputted as the signal rF_tbl[3:0]. In any other case, if the value of the data register r10 is higher than the value of the data register r13, then the output rF_xor [0] becomes "1", and the value "2" (decimal number) is outputted as the signal rF_tbl[3:0].

In the instruction [MVf r5], since the flag selection field #0 702 indicates "1", the label rF_out[3:0] is used as the selection signal for the elector 422, and the value of the data register indicated by the label rF_out[3:0] is supplied as an operand. Consequently, when any of the conditions is satisfied, the value of the data register indicated by the label rF_out[3:0] is transferred to the data register r5.

In this manner, in the present example, the third program example of FIG. 13 is executed in four machine cycles.

FIGS. 16A and 16B illustrate a fourth example of a program illustrating an operation of the mathematical operation processing apparatus of the present embodiment. The fourth program example is used to decide three conditions simultaneously and perform memory loading in accordance with a result of the decision.

FIG. 16A illustrates a program of an object of processing in such a form as is represented by a high-level language. The program illustrated in FIG. 16A signifies that, if the value of the data register r10 is higher than the value of the data register r11, then data are loaded from the "base address+8" address of the memory into the data register r5, but in any other case, if the value of the data register r10 is higher than the value of the data register r12, then data are loaded from the "base address+4" address of the memory into the data register r5, but in any other case, if the value of the data register r10 is higher than the value of the data register r13, then data are loaded from the "base address+0" address of the memory into the data register r5.

FIG. 16B represents the program of a processing object in such a form as is represented by an assembly language, and six instructions juxtaposed in a horizontal direction are executed simultaneously. The instruction [GT r10, r11] is executed by the computing unit #A 501; [GT r10, r12] is executed by the computing unit #B 511; [GT r10, r13] is executed by the computing unit #C 521; and [LWf r5, r0] is executed by the load/store unit 541.

Here, the instruction [LWf r5, r0] is a memory loading instruction for loading data from the memory based on an address obtained by adding, to the base address stored in the data register r0, the value stored in the data register designated by rF_out[3:0] as an address offset and storing the data into the data register r5. The other instructions are the same as described hereinabove with reference to the exe of FIG. 8.

Figure 17:
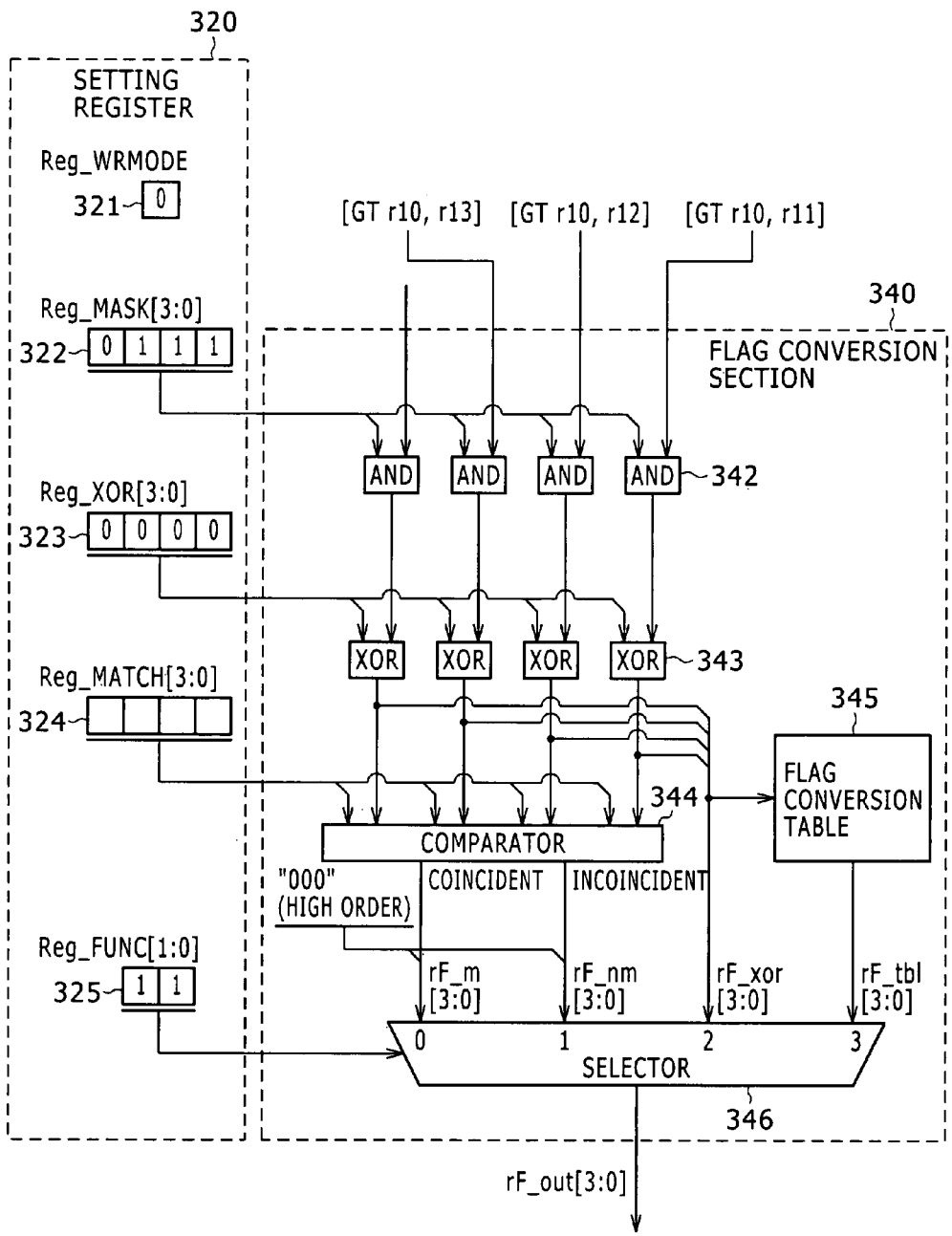
FIG. 17 is a block diagram illustrating an example of setting a setting register for executing the fourth program example of FIGS. 16A and 16B.

FIG. 17 illustrates an example of setting the setting register 320 for executing the fourth program example of FIGS. 16A and 16B. In the present example, "0" is set in the write mode register Reg_WRMODE 321 in advance; "0111" (binary number) is set in the mask register Reg_MASK[3:0] 322; "0000" (binary number) is set in the inversion register Reg_XOR[3:0] 323; and "11" (binary number) is set in the function register Reg_FUNC[1:0] 325.

In the present example, since the write mode register Reg_WRMODE 321 is "0" (indicating the through mode), the condition codes of mathematical operation by the computing units #A to #C 501, 511 and 521 are retained into the registers rF[0 to 2] of the condition code set register.

Then, a logical ANDing operation is performed between the values of the flags of the condition code set register and the corresponding bits of the mask register Reg_MASK[3:0] 322 by the logical ANDing unit 342. In the present example, since the mask register Reg_MASK[3:0] 322 is "0111", only the register rF[3] is masked to "0".

Then, an exclusive ORing operation is performed between the bits of the output of the logical ANDing unit 342 and the corresponding bits of the inversion register Reg_XOR[3:0] 323 by the logical exclusive ORing unit 343. However, in the present example, since the inversion register Reg_XOR[3:0] 323 is "0000", any one of the bits is not reversed.

In the present example, since the function register Reg_FUNC[1:0] 325 is "11", the value of the output rF_tbl [3:0] of the flag conversion table 345 is selected by the selector 346 and outputted as the label rF_out[3:0].

FIG. 18 illustrates an example of setting the flag conversion table 345 for executing the fourth program example of FIGS. 16A and 16B. In the example, the value "0" (decimal number) is placed in advance in the address "0001" of the flag conversion table 345; the value "4" (decimal number) is placed in the addresses "0010" and "0011"; and the value "8" (decimal number) is placed in the addresses "0100" to "0111". They signify the values of the address offset.

The flag conversion table 345 is read out using the output rF_xor[0 to 3] of the logical exclusive ORing unit 343 as a read address and outputs a signal rF_tbl[3:0] to the selector 346. Accordingly, if the value of the data register r10 is higher than the value of the data register r11, then the signal rF_xor [0] becomes "1" and the value "8" (decimal number) is outputted as the signal rF_tbl[3:0]. In any other case, if the value of the data register r10 is higher than the value of the data register r12, then the rF_xor[1] becomes "1" and the value "4" (decimal number) is outputted as the signal rF_tbl[3:0]. In any other case, if the value of the data register r10 is higher than the value of the data register r13, then the rF_xor[2] becomes "1" and the value "0" (decimal number) is outputted as the signal rF_tbl[3:0].

In the instruction [LWf r5, r0], since the flag selection field #0 702 indicates "1", the label rF_out[3:0] is used as the selection signal for the selector 422, and the value of the data register indicated by the label rF_out[3:0] is supplied as an operand. Consequently, if any of the conditions is satisfied, then the value of the data register indicated by the label rF_out[3:0] is supplied as the offset address to the load/store unit 541.

Meanwhile, in the instruction "LWf r5, r0", since the flag selection field #1 703 indicates "0" and the operand field #1 705 indicates "0", the value of the data register r0 is supplied as an address to the load/store unit 541.

Consequently, the load/store unit 541 adds the offset address to the base address and loads data from the memory based on the resulting address. Then, the load/store unit 541 stores the loaded data into the data register r5.

In this manner, in the present embodiment, the fourth program example of FIGS. 16A and 16B is executed in two machine cycles.

In particular, according to the present example, the condition codes by the computing units #A to #D 501, 511, 521 and 531 are combined suitably as a condition code set and converted by the flag conversion section 340, and resulting data are supplied as an operand of a different instruction. Consequently, the supply of an operand which is performed based on a condition code by a plurality of mathematical operations can be performed at a high speed.

While a preferred embodiment of the present invention has been described using specific terms, such description is for illustrative purpose only, and it is to be understood that changes and variations may be made without departing from the spirit or scope of the following claims.

In particular, according to an embodiment of the present invention, the computing elements correspond, for example, to the computing units #A to #D 501, 511, 521 and 531. The condition code set register corresponds, for example, to the condition code set register rF[0 to 3] of the register file 310. Further, the condition code conversion section corresponds, for example, to the flag conversion section 340. Further, the operand supplying section corresponds, for example, to the operand selector 400.

According to an embodiment of the present invention, the masking operation corresponds, for example, to the logical ANDing operation by the logical ANDing unit 342.

According to an embodiment of the present invention, the inversion process corresponds, for example, to the exclusive ORing operation by the logical exclusive ORing unit 343.

According to an embodiment of the present invention, the comparison to decide whether or not a value based on the condition code set coincides with a predetermined value corresponds, for example, to the comparison by the comparator 344.

According to an embodiment of the present invention, the conversion table corresponds, for example, to the conversion table 345.

According to an embodiment of the present invention, the data register corresponds, for example, to the data register in the register file 310.

According to an embodiment of the present invention, the computing elements correspond, for example, to the computing units #A to #D 501, 511, 521 and 531. The condition code set register corresponds, for example, to the condition code set register rF[0 to 3] of the register file 310. Further, the condition code writing section corresponds, for example, to the flag writing section 330. Furthermore, the condition code conversion section corresponds, for example, to the flag conversion section 340. Further, the operand supplying section corresponds, for example, to the operand selector 400.

According to an embodiment of the present invention, the computing elements correspond, for example, to the computing units #A to #D 501, 511, 521 and 531. The masking register corresponds, for example, to the mask register 322. The masking computing element corresponds, for example, to the logical ANDing unit 342. The inversion register corresponds, for example, to the inversion register 323. The inversion processor corresponds, for example, to the logical exclusive ORing unit 343. The comparison pattern register corresponds, for example, to the comparison pattern register 324. The comparator corresponds, for example, to the comparator 344. The conversion table corresponds, for example, to the flag conversion table 345. The selector corresponds, for example, to the selector 346. Further, the operand supplying section corresponds, for example, to the operand selector 400.

According to an embodiment of the present invention, the instruction memory corresponds, for example, to the instruction memory 100. The instruction fetch/decoder corresponds, for example, to the instruction fetch/decoder 200. The computing elements correspond, for example, to the computing units #A to #D 501, 511, 521 and 531. The branching processing section corresponds, for example, to the branching unit 551. The data memory corresponds, for example, to the data memory 600. The load/store processing section corresponds, for example, to the load/store unit 541. The condition code set register corresponds, for example, to the condition code set register rF[0 to 3] of the register file 310. Further, the condition code conversion section corresponds, for example, to the flag conversion section 340. Further, the operand supplying section corresponds, for example, to the operand selector 400.

It is to be noted that the processing procedure described hereinabove in the description of the embodiment of the present invention may be realized as a method having the procedure or as a program for causing a computer to execute the procedure or a recording medium for storing the program.

What is claimed is:

1. A mathematical operation processing apparatus, comprising:
a plurality of computing elements that performs mathematical operations different from one another to produce mathematical operation results, that determines corresponding condition codes of the mathematical operations, and that outputs the mathematical operation results and the corresponding condition codes together;
a condition code set register that receives and retains the corresponding condition codes produced simultaneously by said computing elements as a condition code set;
a condition code conversion section that performs a predetermined conversion for the condition code set and that outputs a result of the conversion as a conversion condition code set;
an operand section that supplies an operand for the mathematical operations in said computing elements and that selects an operand field when a flag selection field is "0" and an output of a flag conversion section when the flag selection field is "1" for the mathematical operations, wherein the output of the flag conversation section is based upon the conversion condition code set.

2. The mathematical operation processing apparatus according to claim 1, wherein said condition code conversion section performs masking operation for at least part of a value based on the condition code set as the predetermined conversion.

3. The mathematical operation processing apparatus according to claim 1, wherein said condition code conversion section performs an inversion process for at least part of a value based on the condition code set as the predetermined conversion.

4. The mathematical operation processing apparatus according to claim 1, wherein said condition code conversion section performs comparison to decide whether or not a value based on the condition code set coincides with a predetermined value as the predetermined conversion and outputs a result of the conversion.

5. The mathematical operation processing apparatus according to claim 1, further comprising a conversion table which retains conversion condition code sets in a corresponding relationship to individual values based on the condition code set, said condition code conversion section extracting that one of the conversion condition code sets which corresponds to the value based on the condition code set from said conversion table.

6. The mathematical operation processing apparatus according to claim 1, wherein said operand section supplies the conversion condition code set for the mathematical operations.

7. The mathematical operation processing apparatus according to claim 1, further comprising a data register including a plurality of words, said operand section supplying a word read out from said data register in accordance with the conversion condition code for the mathematical operations.

8. The mathematical operation processing apparatus according to claim 1, further comprising a branching processing section configured to determine an instruction based on the operand supplied from the operand section.

9. A mathematical operation processing apparatus, comprising:
a plurality of computing elements that perform mathematical operations different from one another to produce mathematical operation results, that determines corresponding condition codes of the mathematical operations, and that outputs the mathematical operation results and the corresponding condition codes together;
a condition code set register that receives and retains the corresponding condition codes produced by said computing elements as a condition code set;
a condition code writing section that receives the mathematical operation results and the corresponding condition codes together from the plurality of computing elements and that writes the condition code set to the condition code set register based on a value of a write mode register;
a condition code conversion section that performs a predetermined conversion for the condition code set and that outputs a result of the conversion as a conversion condition code set;
an operand section that supplies an operand for the mathematical operations in said computing elements and that selects an operand field when a flag selection field is "0" and an output of a flag conversion section when the flag selection field is "1" for the mathematical operations, wherein the output of the flag conversation section is based upon the conversion condition code set.

10. The mathematical operation processing apparatus according to claim 9, further comprising a branching processing section configured to determine an instruction based on the operand supplied from the operand section.

11. A mathematical operation processing apparatus, comprising:
a plurality of computing elements that perform mathematical operations different from one another to produce mathematical operation results, that determines corresponding condition codes of the mathematical operations, and that outputs the mathematical operation results and the corresponding condition codes together;
a condition code set register that receives and retains the corresponding condition codes produced by said computing elements as a condition code set;

a masking register that retains mask bits representative of whether a masking mathematical operation should be performed for each of the condition codes;

a masking computing element that performs a masking computing operation in accordance with said masking register for each of the condition codes, wherein the masking computing operation is a logical ANDing operation between the condition code set of the condition code set register and corresponding mask bits of the mask register;

an inversion register that retains an inversion bit representative of whether or not an inversion process should be performed for each of the condition codes processed by said masking computing element;

an inversion processor that performs an inversion process for each of the condition codes processed by said masking computing element in accordance with said inversion register;

a comparison pattern register that retains a pattern to be used as an object of comparison for each of the condition codes processed by said inversion processor;

a comparator that compares the condition codes processed by said inversion processor and the pattern retained in said comparison pattern register;

a conversion table that retains conversion condition code sets corresponding to combinations of the condition codes processed by said inversion processor;

a selector that selects one of the conversion condition code sets read out from said conversion table in response to a result of the comparison by said comparator, the condition codes processed by said inversion processor or a combination of the condition codes processed by said inversion processor;

an operand section that supplies an operand for the mathematical operations in said computing elements and that selects an operand field when a fly selection field is "0" and an output of a flag conversion section when the flag selection field is "1" for the mathematical operations, wherein the output of the flag conversation section is based upon the conversion condition code set.

12. A mathematical operation processing apparatus, comprising:

an instruction memory configured to retain a program including a plurality of instructions;

an instruction fetch/decoder configured to extract an instruction from said instruction memory and decode the instruction;

a plurality of computing elements that perform mathematical operations different from one another based on a result of the decoding to produce mathematical operation results, that determines corresponding condition codes of the mathematical operations, and that outputs the mathematical operation results and the corresponding condition codes together;

a branching processing section that determines an instruction to be extracted by said instruction fetch/decoder based on the result of the decoding;

a data memory;

a load/store processing section that accesses said data memory to load necessary data from said data memory or store necessary data into said data memory;

a condition code set register that receives and retains the corresponding condition codes produced simultaneously by said computing elements as a condition code set;

a condition code conversion section that performs a perform predetermined conversion for the condition code set and that outputs a result of the conversion as a conversion condition code set;

an operand section that supplies an operand for the mathematical operations in said computing elements, the determination by said branching processing section or the accessing by said load/store processing section and that selects an operand field when a flag selection field is "0" and an output of a flag conversion section when the flag selection field is "1" for the mathematical operations, wherein the output of the flag conversation section is based upon the conversion condition code set.

13. The mathematical operation processing apparatus according to claim 11, further comprising a branching processing section configured to determine an instruction based on the operand supplied from the operand section.

* * * * *